Figure 3:
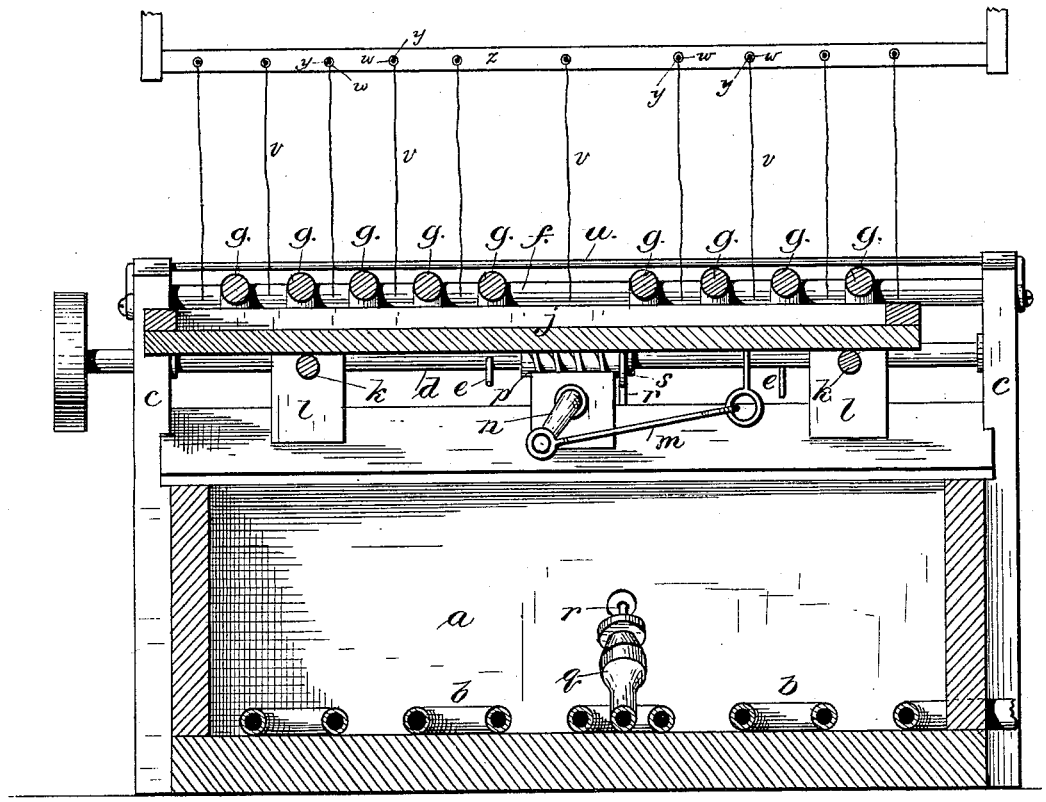

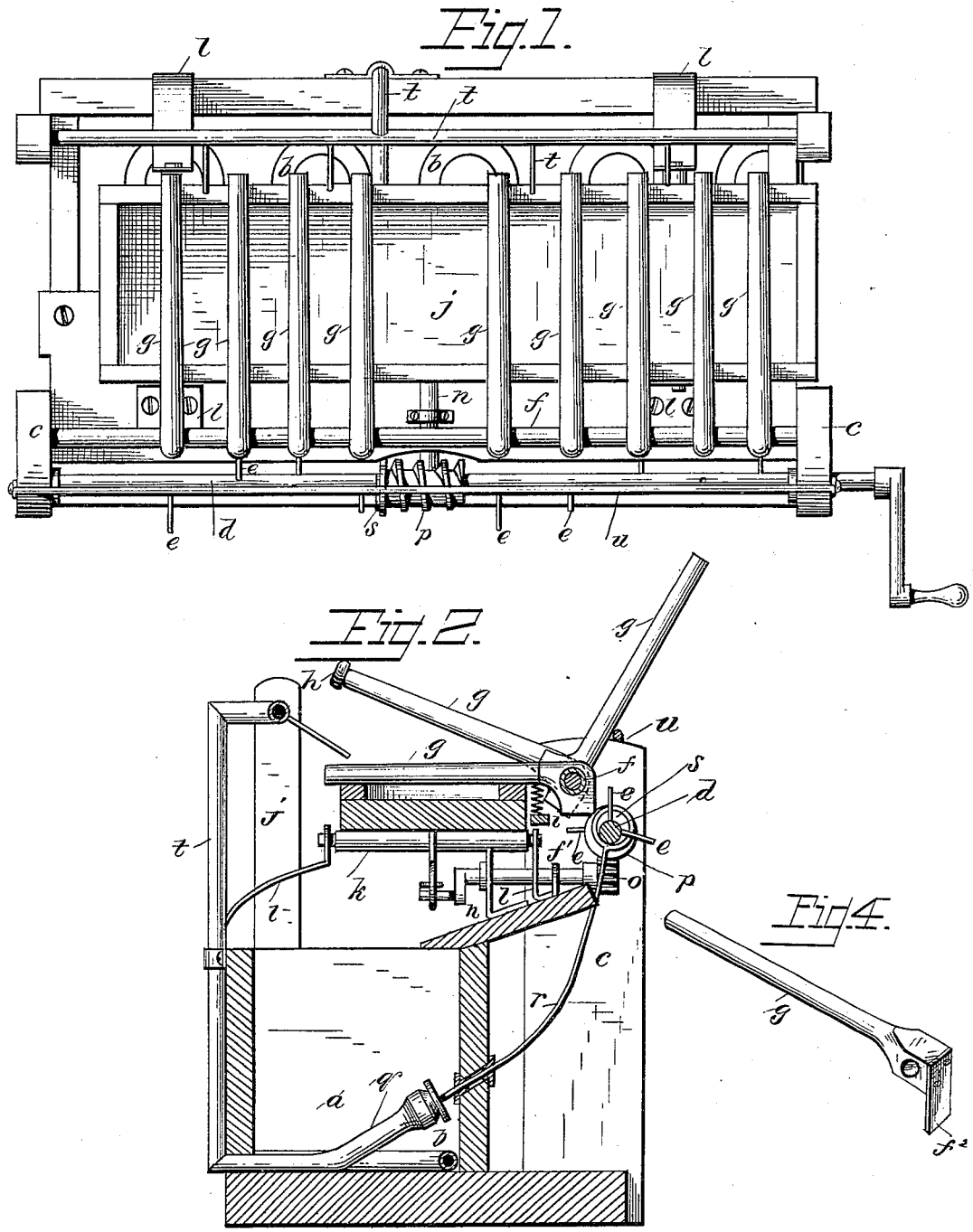

(No Model.)  2 Sheets—Sheet 2.

J. R. RUSSELL.

MACHINE FOR BEATING UP NAPPED HATS.

No. 258,477. Patented May 23, 1882.

WITNESSES
Geo. M. Finckel,
N. C. Chaffee

INVENTOR,
James R. Russell,
by Wm. H. Finckel, Attorney.

UNITED STATES PATENT OFFICE.

JAMES R. RUSSELL, OF BOSTON, MASSACHUSETTS.

MACHINE FOR BEATING UP NAPPED HATS.

SPECIFICATION forming part of Letters Patent No. 258,477, dated May 23, 1882.

Application filed March 23, 1882. (No model.)

*To all whom it may concern:*

Be it known that I, JAMES R. RUSSELL, a citizen of the United States, residing at Boston, in the county of Suffolk and State of Massachusetts, have invented certain new and useful Improvements in Machines for Beating Up Napped Hats; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention in machinery, as a substitute for manual labor in the skillful, troublesome, and laborious operations of beating up napped hats to separate the cotton from the fur therein, is an improvement upon my invention covered by United States Letters Patent No. 251,471, granted December 27, 1881; and the object of this invention is to increase the capacity and improve the construction of the machinery therein set forth.

The improvements consist in the means for operating the sticks; also, in the construction and operation of the plank; also, in the hot-water distribution, and also in the fenders.

In the accompanying drawings, in the several figures of which like parts are similarly designated, Figure 1 is a top plan view of one form of my apparatus. Fig. 2 is a cross-section thereof. Fig. 3 is a longitudinal vertical section. Fig. 4 is a perspective view of a modified form of stick or beater.

In Fig. 3 I have shown the fenders in position.

In order to increase the capacity of the machine I make its several parts larger and increase some of them, as I will now proceed to set forth.

The hot-water tank or kettle $a$ is much longer than in the invention referred to. The water in this tank is kept hot, so as to effectually scald the hats, by steam or other pipes, $b$, coiled closely therein longitudinally or crosswise, and fed from any suitable source. In suitable standards, $c\ c$, is supported a shaft, $d$, provided with a number of tappets, $e$, radiating from it. This shaft is driven by hand or other power suitably applied, and for this purpose I have shown in Fig. 1 a crank and in Fig. 3 a band-pulley. $f$ is a rod arranged in the standards $c\ c$ at a suitable distance with relation to shaft $d$. Upon this rod are hung loosely a number—say from two to one thousand—of sticks or beaters, $g$, having cam ends or heads $f'$, against which the tappets $e$ strike to vibrate said sticks, and the tappets are so arranged as to vibrate the sticks each at a different time, or all together, or in sections, as desired. The sticks themselves may be separated or arranged in pairs or sections. The sticks may fall by gravity after being operated by the tappets, or, since when the machine is run fast the sticks are apt to fly back, their return may be insured by weighting their ends, as at $h$, Fig. 2, or by means of springs $i$ placed above or below them; but, as the motion of the tappets is slow and the throw of the sticks not very great, gravity will usually suffice to bring them down. These sticks are made of hard wood, and their heads $f'$ may be integral therewith or formed by attaching a metal plate, $f^2$, Fig. 4, to the butt of the stick.

Instead of a circular rotary plank such as shown in my patent referred to, I employ a flanged longitudinal plank, $j$, supported upon rollers $k\ k$, journaled in brackets $l\ l$ suitably sustained by the framing. To this plank I impart a longitudinal reciprocating motion by means of a link, $m$, connected thereto and driven by a crank-shaft, $n$, supported by the framing, and deriving motion by means of a worm-wheel, $o$, thereon and a worm, $p$, on the shaft $d$. One or more of these links, crank-shafts, worm-wheels, and worms may be employed, according to the length of the plank.

$q$ is a pump of any approved pattern, arranged, say, in the tank $a$, so as to take hot water therefrom, and suitably protected therein from being choked by sediment, &c. The piston-rod $r$ of this pump is driven by a crank or eccentric, $s$, on the shaft $d$. This pump is so arranged as to force water on the plank through service-pipes $t$, arranged substantially as shown, and one or more such pumps may be employed, according to the size of the machine.

Access may be had to the hats on the plank by simply throwing one or more of the beaters or sticks $g$ out of contact from the tappets up against a rest rod or rail, $u$, as indicated in Fig. 2, the three positions of the sticks being indicated in that figure of the drawings.

The fenders $v$, to keep the hot water splashed by the beaters from the operator, consist of a series of curtains arranged across the plank on a line with the sticks. They are made of any suitable cloth, and are arranged, like window-curtains, to be operated at pleasure at any part of the machine to defend the workman or to enable him to gain access to any part of the plank for directing the beating up of the hats. The details of the arrangement of the fenders may be varied at pleasure consistent with the requirements of the operator. These fenders may be suspended from rods, hooks, or rings connected with the machine-framing or the walls or ceiling of the room in which the machine is placed.

In operation the plank $j$ is supplied with napped hats in any quantity, and the shaft $d$ being rotated, the pump is set in motion and projects hot water into the plank upon the hats, so as to scald them, to cause the cotton under the beating action of the sticks to flow from the fur. The reciprocating motion of the plank brings the whole surface of the hats successively and repeatedly under the action of the sticks, so as to insure the requisite beating up thereof. In this regard my reciprocating plank is vastly superior to and more effective than the endless rotary belts or aprons employed in other machines, for such belts, having a continuous rotary motion in one direction only, carry the hats but once under each stick, unless they be manually replaced upon the belt or apron. The operator watches the progress of the operation and attends to the necessary manipulating and crozing of the hats as their beating up progresses. As already intimated, he can perform these operations upon the moving plank by simply throwing back upon the rail $u$ one or more of the sticks. The water in the plank overflows therefrom into the tank, where it is reheated and reused.

It will be understood that the supplying of hot water to the hats upon the plank obviates the necessity for what is technically known as "manual dipping" in a kettle or tank, and hence saves the operator's hands from scalding.

The advantages of a longitudinally-reciprocating plank over forms heretofore shown are that the capacity of the machine can be greatly increased at a very small cost, the construction of the machine simplified, and the necessary motion of the plank to bring its burden under the action of the beaters is obtained in a simpler and more direct manner. The supporting of the plank upon a fixed bed gives greater stability to it and facilitates its operation, and at the same time simplifies and cheapens the construction. The pivoting of the beaters and operating them from the rear of their pivots and combining therewith springs or weights to aid their fall and increase the effect thereof enable me to more nearly simulate the action and motion of the hand with them—that is, their vibration is less restrained, is freer, and more effectual.

In Fig. 3 the fenders $v$ are provided with rings $w$, strung upon rods $y$, which rods are suspended by a frame, $z$, from the ceiling; but, as before said, the details of arrangement may be varied, and this one illustration is given simply to direct generally. The particular arrangement shown enables the operator to gain protected access separately to each beater or each lot of hats.

What I claim is—

1. The combination, substantially as shown and described, of a water-fed reciprocating plank arranged upon fixed supports and vibratory beating-up sticks, for mechanically separating the cotton from the fur in napped hats.

2. The combination, substantially as shown and described, of a hot-water supply, a plank supported on rollers, means to reciprocate said plank longitudinally, beating-up sticks overlying such plank, and means to vibrate said sticks.

3. The combination, substantially as shown and described, of a hot-water supply, a plank, means to reciprocate such plank longitudinally, beater-up sticks arranged upon a rod and provided with heads, and a shaft having a number of tappets equal in number to the number of the sticks to act upon such heads to vibrate the sticks.

4. The combination, substantially as shown and described, of a tank to hold hot water, a plank above the same, suitably supported beater-up sticks overlying such plank, a shaft provided with tappets to vibrate said sticks, a crank-shaft to reciprocate said plank, and a pump to supply hot water from the tank to the plank.

5. The combination, substantially as shown and described, of the beater-up sticks loosely pivoted upon a rod, with a rail upon which they may be rested in order to gain access to the plank.

6. The fenders arranged longitudinally of, between, and alongside the beater-up sticks, substantially as shown and described, to enable the workman to obtain access to all portions of the plank while protected from the splash.

7. The plank supported upon a fixed bed and adapted to receive a longitudinal reciprocating motion thereupon, substantially as shown and described.

8. The beater-up sticks loosely pivoted upon a rod and operated by tappets acting upon them in the rear of their pivots, combined with means to aid their fall, substantially as and for the purpose described.

In testimony whereof I affix my signature in presence of two witnesses.

JAMES R. RUSSELL.

Witnesses:
JOSEPH B. BRAMAN,
C. A. SHAW.